United States Patent Office 3,505,282
Patented Apr. 7, 1970

3,505,282
POLYESTERS OF 1,2,3,4 - TETRAHYDRO-
NAPHTHALENES AND PROCESSES FOR
THEIR MANUFACTURE
Phillip W. Storms, Denver, and Grover L. Farrar, Littleton, Colo., assignors to Marathon Oil Company, Findlay, Ohio, a corporation of Ohio
No Drawing. Filed Mar. 2, 1967, Ser. No. 619,949
Int. Cl. C08g 17/08
U.S. Cl. 260—47                                      6 Claims

ABSTRACT OF THE DISCLOSURE

A process for the production of polyesters of tetrahydronaphthalenes from dicarboxynaphthalenes by:
(a) contacting naphthalenedicarboxylic acid, or the ester thereof, with hydrogen in the presence of a reduced nickel catalyst comprising in excess of 50% by weight nickel to form 1,2,3,4-tetrahydronaphthalenedicarboxylic acid, or its ester,
(b) polymerizing said acid or ester with polyols in the presence of a polymerization catalyst to form a polymer.

The polyesters are useful in the manufacture of molded products, cast products, films, fibers, when the polyesters are dissolved in vehicles or coatings. The diacids of these polyesters may be copolymerized with tere-, iso- and -phthalic acid. In addition, the polymers of the present invention may be utilized in non-chemical admixture or alloy with other polymeric materials.

CROSS REFERENCES TO RELATED APPLICATION

United States patent application 529,220, filed by the present applicants and assigned to the assignee of the present application, deals with processes for the manufacture of compounds which are somewhat related to the polyesters of the present invention, including hydronaphthalenes, particularly tetrahydronaphthalenes and substituted tetrahydronaphthalenes.

BACKGROUND OF THE INVENTION

Field of the invention

The techniques of manufacture of polyesters and the applications of these materials are the subject of widespread interest because of the versatility and desirable properties of this type of polymeric material. The processes and products of the present invention for the first time provide the versatile Tetralin structure with its fused aromatic and saturated rings in a polymeric material.

Description of the prior art

In addition to the wide variety of literature in the general field of polyesters, certain patents, e.g. British 1,024,481, have related to the formation of polyester compounds from hydrogenated naphthalene acids and their derivatives. However, our work pre-dates the issue date of the above British patent and so far as we know, no patent has taught the use of Tetralin derivatives for the production of polyesters.

SUMMARY

According to the present invention, tetrahydronaphthalene dicarboxylic acid or the esters thereof formed from such acids by reaction with monohydric organic compounds, or the acid chlorides formed from such acids by reaction with thionyl chloride or other suitable chlorinating agent, are reacted with polyols (that is, organic compounds containing two or more hydroxyl groups) to form polyester polymeric materials.

The starting materials of the present invention are the isomers of 1,2,3,4 - tetrahydronaphthalenedicarboxylic acid, its esters and acid chlorides. Thus, the starting materials may have both functional groups on the saturated nucleus, both on the unsaturated nucleus, or one on the saturated and one on the unsaturated nucleus. Especially preferred, of the isomers is 1,2,3,4-tetrahydronaphthalene-2,6-dicarboxylic acid, its esters and its acid salts. The preferred starting materials are those exemplified by the following formula

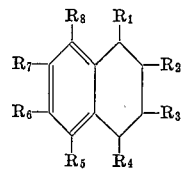

wherein:

2 R groups are COOCH$_3$ and the remainder are H
2 R groups are COOH and the remainder are H
2 R groups are COCl and the remainder are H 1,2,3,4-tetrahydronaphthalene dicarboxylic acids (THN acid) are preferably prepared according to the methods of U.S. application 529,220 mentioned above. Thus, naphthalene or substituted naphthalene is reacted with hydrogen at a temperature of from about 0 to 200° C., preferably 75 to about 175° C., and most preferably 130 to about 160° C., at pressures of from about 500 to about 10,000 p.s.i.g., preferably from about 1,000 to about 3,000, and most preferably from about 1,200 to about 1,500 p.s.i.g., in the presence of a catalyst comprising at least 50%, and preferably at least 60% nickel in a reduced state. These catalysts are essentially non-pyrophoric and are exemplified by that sold under the trade designation Girdler Catalyst G–49A (Chemetron Corp.). The amount of catalyst utilized can vary, but will generally be in the range of from about 10 to about 100 parts of naphthalene or substituted naphthalene for each part by weight of catalyst employed. Reaction times for the hydrogenation are not especially critical, but will generally range from about 20 minutes to 2 hours, more preferably from 30 minutes to about an hour. It is an important feature of the aforementioned U.S. application 529,220 that the hydrogenation essentially ceases, or at least reduces substantially in rate, upon the attainment of Tetralin nuclei.

As mentioned previously, the polyesters of the present invention are produced by the reaction of the above mentioned THN acid or its derivatives with polyols. The preferred polyols will be cyclic, either aromatic or aliphatic. The hydroxyl groups are preferably located at opposite ends of the molecule or within 1 to 3 positions of opposite ends of the molecule. Especially preferred polyols are: 1,4 cyclohexane dimethanol, 1,3 cyclohexane dimethanol, bisphenol A, the bishydroxyethylether of bisphenol A, 2,6 Decalin-dimethanol, Tetralin diol [produced as described in co-pending application 330,000 (Dec. 12, 1963) now U.S. Patent No. 3,375,285 granted Mar. 26, 1968 of P. A. Argabright] and 4,4'-dihydroxydiphenyl methane. Mixtures of various polyols may be utilized and so also may the alkyl derivatives, particularly the methyl and ethyl derivatives of the aforementioned polyols.

The polymerization step of the present invention may be accomplished by various conventional techniques including bulk transesterification, interfacial polymerization, and solution polymerization. These will be mentioned briefly, but should be understood to be susceptible to the techniques generally empolyed in polymerization, particularly in the preparation of conventional polyesters.

Bulk transesterification is accomplished by mixing the ester and the polyol under a nitrogen blanket at temperatures sufficient to maintain the reaction mixture molten and sufficiently low to prevent decomposition (preferably from about 50° C. to about 400° C., more preferably from 100° C. to about 350° C., and most preferably from 200° C. to about 300° C.) preferably at pressures of from about 0.001 p.s.i.a. to about 1,000 p.s.i.a., more preferably from about 0.001 p.s.i.a to about 25 p.s.i.a., and most preferably from about 0.001 p.s.i.a. to about 15 p.s.i.a., in the presence of polymerization catalyst. The suitable catalysts are generally metal-containing catalysts, which quite commonly are of the acetate, oxide or inorganic ester type, e.g., lead oxide, antimony oxide, tetra-n-butyl titanate, tetra-isopropyl titanate, calcium acetate and cobaltous acetate. By-product alcohol should be removed continuously to enhance the reaction. The resulting product polymer is separated from any excess polyol or any unreacted starting materials and conventionally extruded, cast, or dissolved in solvent to form coating materials.

The polymerization step of the present invention can be accomplished in the case of the acid chloride by the use of interfacial polymerization. This is a polycondensation of the acid chloride with the polyol accomplished by dissolving the acid chloride in a solvent, e.g. methylene chloride, chloroform, or carbon tetrachloride, or other suitable solvent which is inert under the conditions of the reaction, and thereafter contacting the resulting solution with an aqueous solution of an alkali metal salt of the polyol, or some other suitable soluble salt capable of reacting to cause polymerization with the acid chloride. Temperatures for this type of polymerization will generally be in the range of from about 5 to about 300°, with temperatures of from about 20 to about 100° being more preferred, care being taken to maintain the reaction materials in a liquid state. In this type of reaction the solvents are chosen so as to be immiscible and the reaction occurs at the interface between the two solutions. The insoluble product is generally recovered by conventional filtration. Pressures in this type of polymerization are generally in the range of from about 0.01 to over 10,000 p.s.i.a., with pressures of from about 1 to about 100 p.s.i.a. being most preferred.

The techniques described above for the transesterification process may be used with THN acid and its acid chloride as well as with its ester. The above described interfacial polymerization process is most generally limited to the acid chlorides of the acid. Solution polymerization techniques are also readily adaptable to the acid chloride. Solution polymerization is accomplished by dissolving both the acid chloride and the polyol in a suitable solvent, e.g. methylene chloride, carbon tetrachloride, chloroform and stirring in the presence of a catalyst which serves to remove by-product hydrogen chloride. Various catalysts may be employed, e.g. alkali metal hydroxides, alkaline earth metal hydroxides, alkali metal carbonates, alkaline earth metal carbonates, and, most preferred, pyridine. Among the products of the present invention are: polymers containing the tetrahydronaphthalene radical and isomers thereof:

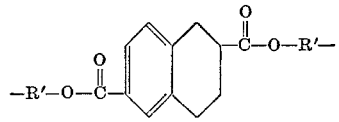

Wherein R' is a carbon chain containing from 2 to 40 carbon atoms.

The following examples will serve to further explain the invention, but all of the various modifications and variations which will be obvious to those skilled in the art upon a reading of the present specification, should be included within the spirit of the claims appended hereto.

EXAMPLE I

To a 2-liter stirred reactor are added 600 ml. of cyclohexane, 80 grams of 2,6-dicarbomethoxynaphthalene and 2 grams of a nickel-on-kieselguhr catalyst (Gridler Catalyst G–49A). After purging the air several times with hydrogen, the reactor is pressured to 1100 p.s.i.g. with hydrogen and the temperature of the reaction mixture is brought to 150° C. After 2 hours hydrogen uptake stops and the mixture is removed from the reactor, filtered and the solvent evaporated to give a 96% yield of 1,2,3,4-tetrahydro-2,6-dicarbomethoxynaphthalene.

EXAMPLE II

A solution of 1,2,3,4-tetrahydronaphthalene-2,6-dicarbonyl chloride (4.8 parts) in methylene chloride (75 parts) is added slowly to a vigorously agitated solution of the disodium salt of 4,4'-dihydroxydiphenyl propane (5.0 parts) in distilled water (86 parts), containing (0.0133 part) surfactant (Du Pont Duponol ME). The solid polyester precipitates immediately and is separated by filtration, washed and dried. It melts over the range 246–270° C., is soluble in chloroform and can be molded at 221° C.

EXAMPLE III

Dimethyl - 1,2,3,4 - tetrahydro-2,6-naphthalenedicarboxylate (12.4 parts) and ethylene glycol (7.4 parts) are added to a test tube with tetra-iso-propyl titanate (0.05 part). The mixture is heated to 190° C, using a nitrogen bubbler to provide mixing and an inert atmosphere until methanol ceases to distill. Then, the pressure is reduced to 0.1 mm. pressure and the temperature raised to 240–280° C. gradually to remove excess glycol and increase molecular weight of the polymer. The resulting polymer softens and melts over the range 75–140° C.

EXAMPLE IV 1,2,3,4 - tetrahydronaphthalene-2,6-dicarbonyl chloride (6.7 parts) in methylene chloride (75 parts) is added with stirring at 20° C. to a solution of the bishydroxyethyl ether of bisphenol A (6.5 parts) and pyridine (5.8 parts) in methylene chloride (25 parts). After a 2 hour reaction period, the polymer is precipitated by adding acetone-water mixture and collected by filtration.

What is claimed is:
1. A process for the production of fiber forming polyesters of tetrahydronaphthalenes produced by a process comprising in combination the steps of:
  (a) contacting naphthalene dicarboxylic acid or the lower alkyl ester thereof with hydrogen under the pressure of about 500 to about 10,000 p.s.i.g. and at a temperature of from about 0° C. to about 200° C, in the presence of a reduced nickel catalyst comprising in excess of 50% by weight nickel to form 1,2,3,4-tetrahydronaphthalene dicarboxylic acids, or the di (methyl esters) thereof,
  (b) polymerizing said 1,2,3,4-tetahydronaphthalene dicarboxylic acid or the diacid chloride or the di (methyl ester) thereof and a polyol selected from the group consisting of 1,4-cyclohexane dimethanol, 1,3-cyclohexane dimethanol, bisphenol A, the bis hydroxy ethyl ether of bisphenol A, 2,6-Decalindimethanol, Tetralin diol, 4,4'-dihydroxy diphenyl methane, ethylene glycol, lower alkyl derivatives of the foregoing and mixtures of the foregoing in the presence of a polymerization catalyst selected from the group consisting of pyridine, alkali metal hydroxides, alkaline earth metal hydroxides, alkali metal carbonates, alkaline earth metal carbonates, the oxides of antimony and lead, the acetates of calcium and cobalt, and the esters of titanium.

2. Fiber-forming polymers containing the recurring unit have the following structure:

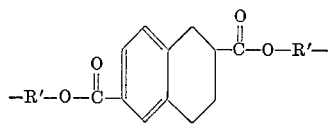

whether R' is a carbon chain containing from 2 to 40 carbon atoms.

3. The polyester reaction product of 1,2,3,4-tetrahydronaphthalene 2,6 dicarboxylic acid, its methyl esters or its acid chlorides with 1,4 cyclohexane dimethanol, 1,3 cyclohexane dimethanol, bisphenol A, the bishydroxyethylether of bisphenol A, 2,6 Decalin-dimethanol, Tetralin diol, 4,4'-dihydroxydiphenyl methane, or lower alkyl derivatives of the foregoing or mixtures of the foregoing.

4. A fiber-forming polymer insoluble in methylene chloride, soluble in chloroform and having a melting point substantially within the range 246° to 270° C. consisting essentially of the reaction product of 1,2,3,4-tetrahydronaphthalene-2,6-dicarboxylic acid, its methyl esters or its acid salt with the disodium salt of 4,4'-dihydroxydiphenyl propane.

5. A fiber-forming polymer having a melting point substantially within the range 75 to 140° C. consisting essentially of the reaction product of dimethyl-1,2,3,4-tetrahydro-2,6-naphthalene dicarboxylate and ethylene glycol.

6. A fiber-forming polymer substantially soluble in methylene chloride consisting essentially of the reaction product of 1,2,3,4-tetrahydronaphthalene-2,6-dicarboxy naphthalene, its methyl ester or acid chloride with the bishydroxyethylether of bisphenol A and pyridine.

References Cited

UNITED STATES PATENTS

| | | | |
|---|---|---|---|
| 2,065,756 | 12/1936 | Scott. | |
| 3,418,276 | 12/1968 | Izard | 260—75 XR |
| 3,123,587 | 3/1964 | Hogsed | 260—75 |
| 3,271,365 | 9/1966 | Parham | 260—47 |
| 3,293,223 | 12/1966 | Duling | 260—75 |
| 3,385,831 | 5/1968 | Watson | 260—75 |
| 3,390,132 | 6/1968 | Walker | 260—75 |
| 3,391,223 | 7/1968 | Di Leone | 260—871 |

FOREIGN PATENTS

| | | |
|---|---|---|
| 109,642 | 1/1964 | Czechoslovakia. |
| 6,506,941 | 12/1965 | Netherlands. |

OTHER REFERENCES

Alder et al., Chem. Ber. 87, 237–47 (1954) (chem. abstr. supplied).

Alder et al., Ann. 627, 59–68 (1959) (chem. abstr. supplied).

Henglein et al., Makromol. 54, 1–9 (1962) (chem. abstr. supplied).

WILLIAM H. SHORT, Primary Examiner

L. M. PHYNES, Assistant Examiner

U.S. Cl. X.R.

260—75